(12) United States Patent
Negishi et al.

(10) Patent No.: US 8,757,505 B2
(45) Date of Patent: Jun. 24, 2014

(54) MIXING FAUCET

(75) Inventors: Isao Negishi, Niza (JP); Eiji Seki, Higashimurayama (JP); Shigeru Iwai, Tokyo (JP); Takeshi Hagiwara, Higashimurayama (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 968 days.

(21) Appl. No.: 12/863,026

(22) PCT Filed: Nov. 19, 2008

(86) PCT No.: PCT/JP2008/003393
§ 371 (c)(1),
(2), (4) Date: Oct. 8, 2010

(87) PCT Pub. No.: WO2009/095968
PCT Pub. Date: Aug. 6, 2009

(65) Prior Publication Data
US 2011/0017328 A1    Jan. 27, 2011

(30) Foreign Application Priority Data

Jan. 31, 2008   (JP) .................................. 2008-020202

(51) Int. Cl.
*G05D 23/13* (2006.01)
(52) U.S. Cl.
CPC ........ *G05D 23/1346* (2013.01); *G05D 23/1326* (2013.01)
USPC ..................................... 236/12.11; 236/12.16
(58) Field of Classification Search
USPC ........................... 236/12.1, 12.11, 12.16, 12.2
See application file for complete search history.

(56) References Cited

U.S. PATENT DOCUMENTS

| | | | | |
|---|---|---|---|---|
| 5,806,761 | A | * | 9/1998 | Enoki et al. ................... 236/12.2 |
| 7,611,068 | B2 | * | 11/2009 | Iwai et al. ..................... 236/12.1 |
| 2008/0035209 | A1 | | 2/2008 | Negishi et al. |

FOREIGN PATENT DOCUMENTS

| | | |
|---|---|---|
| JP | 58-187666 U | 12/1983 |
| JP | 61-150585 U | 9/1986 |
| JP | 6-235479 A | 8/1994 |
| JP | 2000-28031 A | 1/2000 |
| JP | 2004-44700 A | 2/2004 |
| JP | 2005-133848 A | 5/2005 |
| JP | 2006-307971 A | 11/2006 |
| JP | 2007-198577 A | 8/2007 |

OTHER PUBLICATIONS

International Search Report, directed to PCT/JP2008/003393, mailed on Feb. 10, 2009, 4 pages.

* cited by examiner

*Primary Examiner* — Cheryl J Tyler
*Assistant Examiner* — Jonanthan Bradford
(74) *Attorney, Agent, or Firm* — Orion Consulting, Ltd.; Joseph P. Farrar, Esq.

(57) ABSTRACT

A mixing faucet (1) includes a casing (2) having a hot water inlet opening (24), a cold water inlet opening (23), and an outlet opening (28); a control valve element (3) slidably mounted in the casing (2); a temperature adjusting screw (7) rotatably disposed in the casing (2); a slider (6) sliding in the casing (2) through rotation of the temperature adjusting screw (7); a bias spring (5) disposed in the casing (2), between the control valve element (3) and the slider (6), and biasing the control valve element (3) toward the cold water inlet opening (23); a temperature sensing spring (4) which biases the control valve element (3) toward the hot water inlet opening (24); and a pull-up spring (10) for biasing the control valve element (3) toward the hot water inlet opening (24).

14 Claims, 8 Drawing Sheets

MIXING FAUCET

BACKGROUND OF THE INVENTION

1. Field of the Invention

The present invention relates to a mixing faucet that is mounted to a bathroom spigot or the like and can discharge freely hot and cold water by mixing hot water and cold water, and more specifically relates to a mixing faucet that maintains the temperature of mixed water at a predetermined temperature by modifying the proportion between opening areas of hot water inlet openings and cold water inlet openings by displacing a valve body using a temperature sensing spring the elastic force of which changes in accordance with changes in the temperature of mixed water flowing inside.

2. Description of the Related Art

Known conventional mixing faucets include (for instance, JP 2006-307971 A) a mixing faucet wherein a hot water inlet opening and a cold water inlet opening are opened in succession, spaced apart in the axial direction, in the peripheral wall of a bottomed tubular casing, from the bottom toward an opening side that constitutes an outlet opening; a control valve element slidably disposed inside the casing is brought to a balanced state by being wedged between a bias spring and a temperature sensing spring in the form of an SMA (shape memory alloy) spring; and the properties of the SMA spring are exploited in such a manner that when there rises the temperature of mixed water, being a mixture of hot water and cold water, the biasing force of the SMA spring on the control valve element is increased, whereby the balance with the bias spring is upset and the opening area of the hot water inlet opening is reduced, and the control valve element slides so as to increase the opening area of the cold water inlet opening; and conversely, when the temperature of mixed water drops, the biasing force of the SMA spring on the control valve element is reduced, whereby the balance with the bias spring is upset and the opening area of the hot water inlet opening is increased, and the control valve element slides so as to reduce the opening area of the cold water inlet opening; so that, as a result of the foregoing, the mixed water was kept at a predetermined temperature.

The mixing faucet using an SMA spring as a temperature sensing spring is problematic in that in a cold water discharge state, arrived at through closing of the hot water inlet opening and opening of the cold water inlet opening alone by means of the control valve element, the temperature of cold water flowing through the interior drops, as a result of which the elastic force of the SMA spring decreases, and thus the hot water inlet opening is harder to close. In the mixing faucet of JP 2006-307971 A, a pull-up spring is provided in the bottom side within the casing, so that the decrease in elastic force of the SMA spring that accompanies a drop in the water temperature is compensated through the action of the biasing force of the pull-up spring on the control valve element during a cold water discharge state.

The mixing faucet using an SMA spring as a temperature sensing spring was advantageous in that it afforded a compact mixing faucet since the SMA spring by itself functions as an actuator, but was problematic in terms of cost, since the material of the SMA spring is expensive. Costs can be significantly cut by reducing the wire diameter and the number of turns of the SMA spring as much as possible, but SMA springs have a weaker biasing force than ordinary coil springs, and there are also limitations to the extent to which wire diameter and number of turns can be reduced.

SUMMARY OF THE INVENTION

In the light of the above, it is an object of the present invention to provide a mixing faucet that can use a low-cost temperature sensing spring.

In order to attain the above goal, the present invention comprises a tubular casing; a hot water inlet opening and a cold water inlet opening, provided spaced apart from each other in the axial direction, in the peripheral wall of the casing; an outlet opening provided in the end of the casing, on the side of the cold water inlet opening; a control valve element provided inside the casing slidably in the axial direction, and capable of switching, by sliding within the casing, between any one of a cold water discharge state of closing the hot water inlet opening and opening the cold water inlet opening, whereby only cold water is discharged out of the outlet opening, a mixed water discharge state of opening the hot water inlet opening and the cold water inlet opening, whereby hot and cold water are mixed and discharged out of the outlet opening, and a hot water discharge state of opening the hot water inlet opening and closing the cold water inlet opening, whereby only hot water is discharged out of the outlet opening; a temperature adjusting screw rotatably disposed inside the casing, at one end thereof on the side of the hot water inlet opening, such that one end of the temperature adjusting screw is exposed out of the casing in the axial direction; a slider that is disposed inside the casing so as to be screwed to the temperature adjusting screw in a state of being prevented from rotating, and that slides in the axial direction within the casing through rotation of the temperature adjusting screw; a bias spring that is disposed inside the casing between the control valve element and the slider, and that biases the control valve element toward the cold water inlet opening; a temperature sensing spring that is disposed inside the casing, and that biases the control valve element toward the hot water inlet opening, the elastic force of the temperature sensing spring changing in accordance with changes in the temperature of hot and cold water flowing inside the casing; and a pull-up spring that biases the control valve element toward the hot water inlet opening in the cold water discharge state and the mixed water discharge state.

In the present invention, the position of the slider that slides within the casing in the axial direction is modified through rotation of the temperature adjusting screw, and the compression rate of the bias spring is modified, thereby modifying the biasing force of the bias spring on the control valve element. As a result there can be switched between a cold water discharge state, a mixed water discharge state and a hot water discharge state. In the mixed water discharge state, the control valve element is at a balance position in which there is balanced the force with which the bias spring biases the control valve element toward the cold water inlet opening, and the resultant force with which the temperature sensing spring and the pull-up spring bias the control valve element toward the hot water inlet opening. The elastic force of the temperature sensing spring changes in accordance with changes in the temperature of mixed water that flows within the casing, as a result of which the above balance position changes also, causing the control valve element to slide in the axial direction and modifying as a result the proportion between the opening areas of the hot water inlet opening and the cold water inlet opening. The temperature of the mixed water discharged out of the outlet opening can be kept thereby at a predetermined temperature.

In the mixed water discharge state, the bias spring that biases the control valve element toward the cold water inlet opening is balanced with the resultant force of the temperature sensing spring and the pull-up spring that bias the control valve element toward the hot water inlet opening. Therefore, the biasing force of the temperature sensing spring can be weakened simply through biasing of the pull-up spring on the control valve element. The cost of the mixing faucet as a whole can be thus reduced through the use of a low-cost temperature sensing spring having a small wire diameter and few turns.

In the present invention, preferably, a through-hole running through in the axial direction of the casing is formed in the control valve element; there is provided a rod that has, at one end thereof, a locking portion which is locked to the slider, that extends through the through-hole of the control valve element up to the inside of the temperature sensing spring, and that has, at the other end thereof, an extension portion that extends outwards in the radial direction; and the pull-up spring is disposed between the control valve element and the extension portion of the rod, within the temperature sensing spring.

In such a configuration, the pull-up spring is disposed within the temperature sensing spring. This allows assembling the pull-up spring without increasing the size of the casing, by exploiting the inward space of the temperature sensing spring. Conventionally, by contrast, the pull-up spring was disposed between the temperature adjusting screw and the slider, and hence it was necessary to secure a space for arranging the pull-up spring between the slider and the temperature adjusting screw, which entailed a larger casing.

If the pull-up spring is disposed within the temperature sensing spring, a partition barrel that suppresses contact of hot and cold water with the pull-up spring is preferably provided between the pull-up spring and the temperature sensing spring. When the pull-up spring is thus disposed within the temperature sensing spring, the hot and cold water come also into contact with the pull-up spring, since the hot and cold water that flow inside the casing come into contact with the temperature sensing spring. This may give rise to noise and/or increased flow passage resistance that accompany the resulting turbulent flow. Therefore, the above partition barrel is provided to make it less likely for hot and cold water, which flow through the interior of the casing, to come into contact with the pull-up spring. This suppresses the generation of turbulent flow, so that noise and increases in flow passage resistance can be prevented as a result.

In the present invention, preferably, there is provided a bias spring release mechanism that releases the biasing of the bias spring on the control valve element in the cold water discharge state. As a result, the biasing force exerted by the bias spring on the control valve element is released by the bias spring release mechanism upon drawing of the slider toward the temperature adjusting screw, and accompanying closing of the hot water inlet opening by the control valve element, through rotation of the temperature adjusting screw. Therefore, the control valve element can slide smoothly toward the hot water inlet opening on account of the biasing forces of the temperature sensing spring and the pull-up spring, and the hot water inlet opening can be closed reliably and easily by the control valve element.

As a configuration of the bias spring release mechanism, for instance, a through-hole running through in the axial direction of the casing may be formed in the control valve element, the mixing faucet may be provided with a rod that has, at one end thereof, a locking portion which is locked to the slider, and that extends through the through-hole of the control valve element up to the inside of the temperature sensing spring, and the bias spring release mechanism may include a projecting member that is provided in the rod, is slidable within the through-hole of the control valve element, and has a projecting portion that protrudes outwards, in the radial direction, beyond the outer peripheral face of the rod, such that in the cold water discharge state, an end face of the projecting portion of the projecting member, on the side of the slider, is positioned further toward the slider than an opening end of the through-hole of the control valve element, on the side of the slider, and the bias spring moves away from the control valve element by the abutment of the projecting member and the bias spring, whereby the biasing of the bias spring on the control valve element is released.

In such a configuration, the abutting surface area with the bias spring by the projecting member is greater than in the case where a comparatively small shoulder, formed on the rod itself, abuts the bias spring by way of a washer or the like, in the cold water discharge state. The above configuration allows constructing a bias spring release mechanism easily, without the need for high-precision machining of a small shoulder on the rod.

In the present invention, preferably, there is provided a pull-up spring release mechanism that releases the biasing of the pull-up spring on the control valve element in the hot water discharge state. In such a configuration, the pull-up spring biases the control valve element toward the hot water inlet opening during the cold water discharge state and mixed water discharge state. The biasing force of the temperature sensing spring can be weakened as a result. In the hot water discharge state, the biasing force of the bias spring overcomes the biasing force of the temperature sensing spring, so that the control valve element can easily close thereby the cold water inlet opening, and the biasing force load that the springs exert on the control valve element is reduced.

In a case where the casing comprises a casing main body and a cap body connected to the casing main body, preferably, one end of the casing main body or the cap body is formed with a plurality of projecting pieces extending toward the other end; a plurality of receiving portions that receive the projecting pieces are formed in the outer peripheral face of the other end; first groove portions extending in the circumferential direction are formed in the outer peripheral face of the projecting pieces; second groove portions extending in the circumferential direction are formed in the outer peripheral face of the other end, at positions between the receiving portions; each of the first groove portions and each of the second groove portions make up an annular groove continuous in the circumferential direction, in a state where each of the projecting pieces is received in the corresponding receiving portion; and a retaining ring is fitted to the annular groove.

Although the method for connecting the casing main body and the cap body may also involve forming a male screw thread on one of the foregoing bodies and a female screw thread on the other, and screwing the bodies to each other, a configuration such as the above allows securing reliably the connection between the casing main body and the cap body, without loosening the screwing between the foregoing on account of vibration or the like.

In the present invention, preferably, the bias spring is housed in a housing portion provided in the control valve element; and an end of the housing portion, on the side of the slider, is positioned further toward the slider than the hot water inlet opening in the hot water discharge state. In such a configuration, hot water that flows in from the hot water inlet is less likely to come into contact with the bias spring, and turbulent flow is suppressed, as a result of which there can be curtailed increases in the flow passage resistance and generation of noise.

In the present invention, preferably, there is provided a slider disengagement-preventing member that is disposed on the inner peripheral face of the casing and between the slider and the control valve element, and that prevents the slider from disengaging from the temperature adjusting screw as a result of unscrewing of the temperature adjusting screw and the slider. Such a configuration allows preventing the slider from disengaging from the temperature adjusting screw as a result of unscrewing of the temperature adjusting screw and the slider on account of excessive turning of the temperature adjusting screw.

DESCRIPTION OF THE PREFERRED EMBODIMENTS

Figure 1:
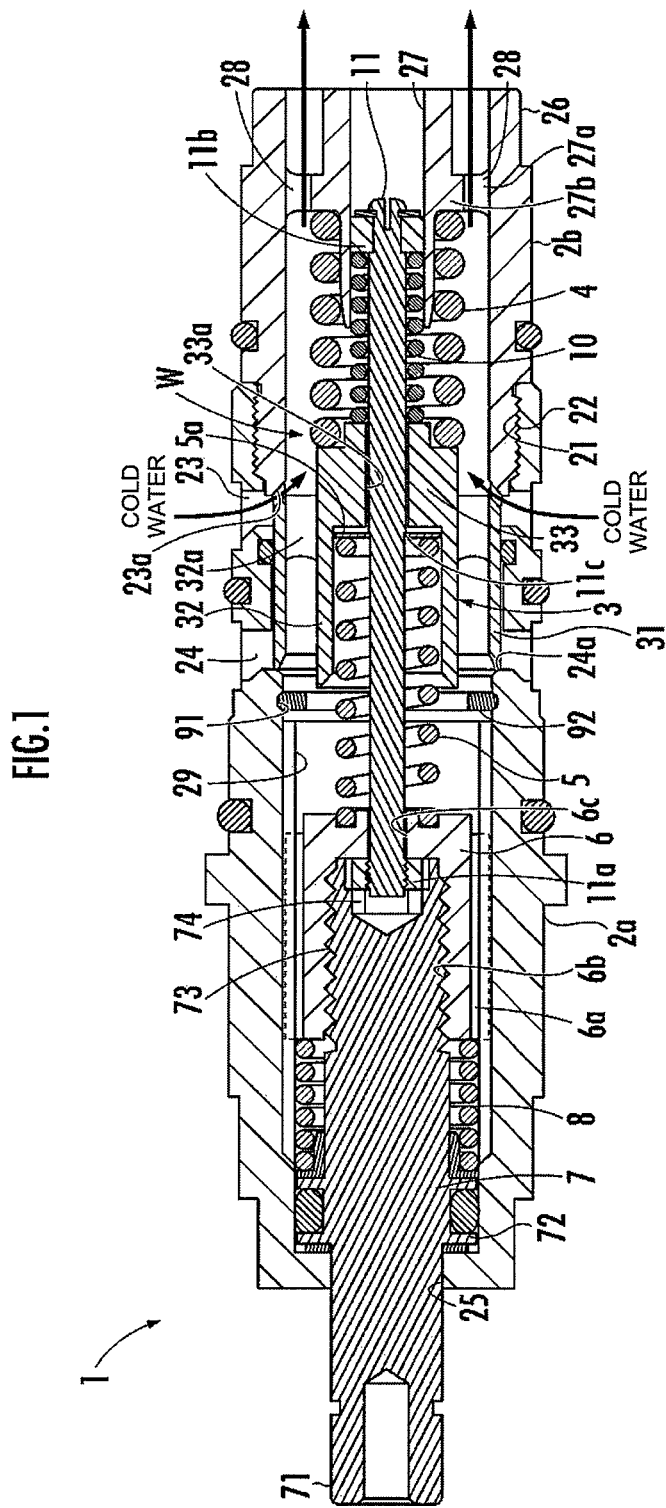
FIG. 1 is an explanatory cross-sectional diagram illustrating a cold water discharge state of a mixing faucet of a first embodiment.
Figure 2:
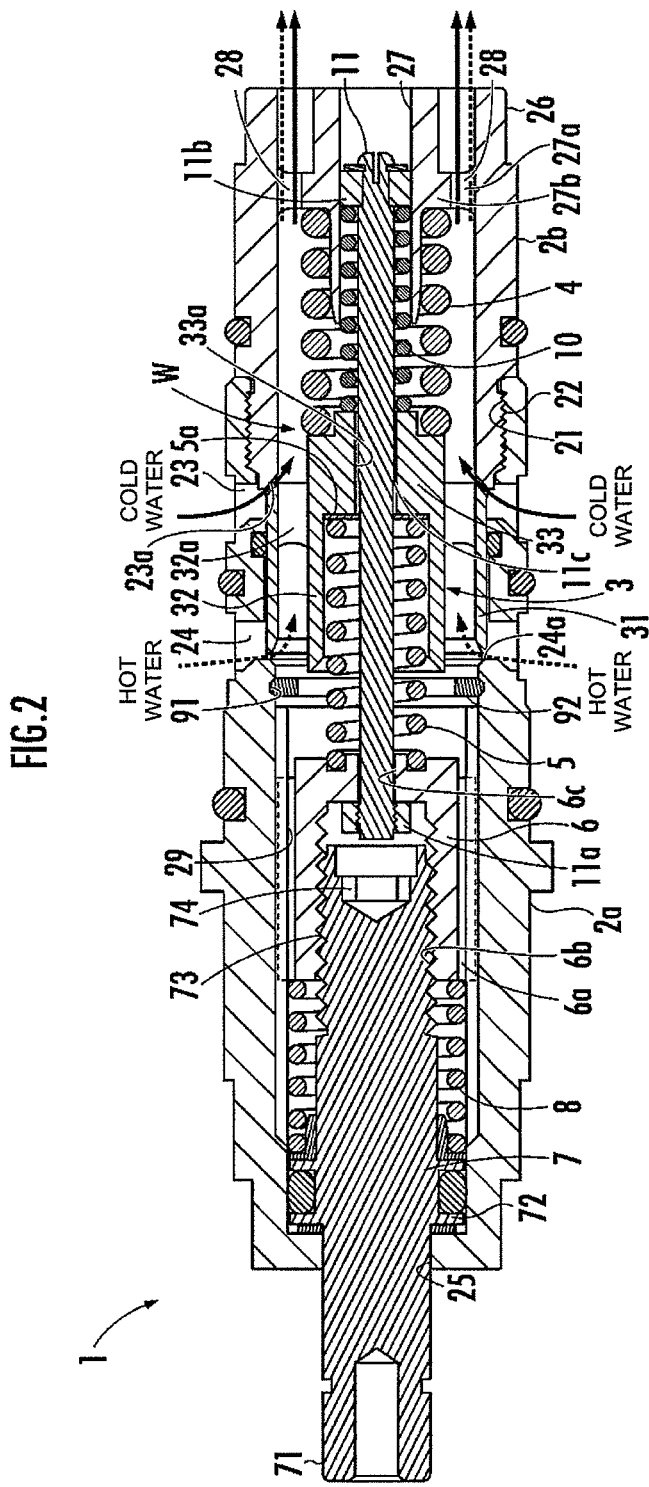
FIG. 2 is an explanatory cross-sectional diagram illustrating a mixed water discharge state of the mixing faucet of the first embodiment.
Figure 3:
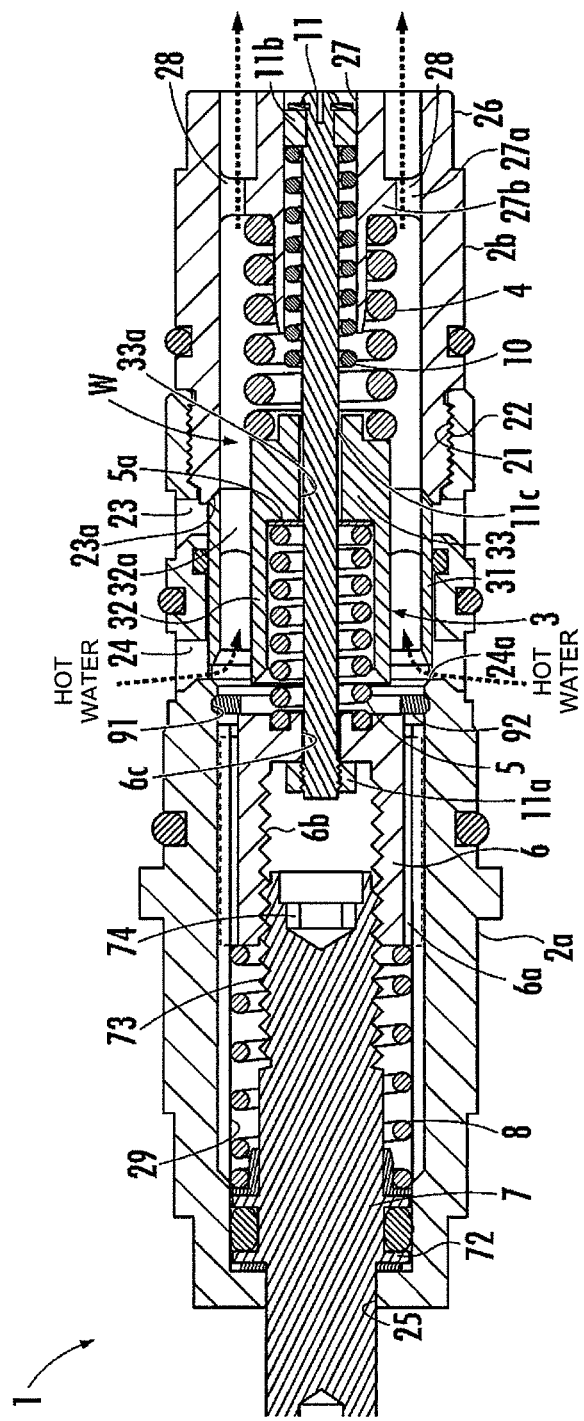
FIG. 3 is an explanatory cross-sectional diagram illustrating a hot water discharge state of the mixing faucet of the first embodiment.

As illustrated in FIGS. 1 to 3, a mixing faucet 1 of the first embodiment of the present invention comprises a tubular casing 2 and a control valve mechanism W built inside the casing 2.

The casing 2 comprises a bottomed tubular casing main body 2a having a female screw thread 21 at an opening end; and a tubular cap body 2b, having a male screw thread 22 that is screwed to the female screw thread 21 of the casing main body 2a at one end, and having an outlet opening 28 at the other end.

The casing main body 2a has a plurality of cold water inlet openings 23 opened at intervals in the circumferential direction and positioned further toward the bottom than the female screw 21; a plurality of hot water inlet openings 24 opened at intervals in the circumferential direction and positioned further toward the bottom than the cold water inlet openings 23, by a predetermined spacing from the latter; and a hole portion 25 opened in the center of the bottom wall.

The cap body 2b comprises an outer tubular portion 26 having the male screw thread 22; and an inner tubular portion 27 supported concentrically by a plurality of connecting portions 27a, inwards of the latter, the connecting portions 27a being disposed at intervals in the circumferential direction at the other opening end, on the opposite side to the side at which the male screw thread 22 is formed. The space delimited by the outer tubular portion 26, the inner tubular portion 27 and the connecting portion 27a constitutes an outlet opening 28 through which there is discharged the hot and cold water that flows in through the cold water inlet openings 23 and the hot water inlet openings 24.

The control valve mechanism W comprises a control valve element 3 that can selectively close either the cold water inlet openings 23 or the hot water inlet openings 24; a temperature sensing spring 4 that biases the control valve element 3 toward the hot water inlet openings 24; a bias spring 5 that biases the control valve element 3 toward the cold water inlet openings 23, and a bottomed tubular slider 6 that is slidable within the casing 2 in the axial direction.

The control valve element 3 comprises an outer tubular portion 31; and an inner tubular portion 32 that is integrally formed with the outer tubular portion 31 via a plurality of connecting portions 32a that are formed at intervals in the circumferential direction and that extend inwardly, in the radial direction, from the inner peripheral face of the outer tubular portion 31. The end of the inner tubular portion 32 on the cap body 2b side is closed by a closing wall 33. A throughhole 33a is formed in the closing wall 33, running through the latter in the axial direction. The control valve element 3 is disposed slidably in the axial direction, between an annular hot water-side valve seat 24a that protrudes inwards in the radial direction of the casing main body 2a from the opening edge, on side of the bottom wall, of the hot water inlet openings 24 of the casing main body 2a, and a cold water-side valve seat 23a at the opening edge of the cap body 2b on the side of the male screw thread 22.

The control valve element 3 can switch between any one of a cold water discharge state (FIG. 1) wherein it slides in the axial direction, abuts the hot water-side valve seat 24a and closes thereby the hot water inlet openings 24, and moves away from the cold water-side valve seat 23a to open thereby the cold water inlet openings 23; a mixed water discharge state (FIG. 2) in which the control valve element 3 moves away from the hot water-side valve seat 24a and the cold water-side valve seat 23a and opens the hot water inlet openings 24 and the cold water inlet openings 23; and a hot water discharge state (FIG. 3) in which the control valve element 3 moves away from the hot water-side valve seat 24a to open thereby the hot water inlet openings 24, and abuts the cold water-side valve seat 23a to close thereby the cold water inlet openings 23. The end of the inner tubular portion 32 on the side of the slider 6 is configured in such a manner that the control valve element 3 is positioned further toward the slider 6 than the hot water inlet openings 24 in a cold water discharge state (FIG. 1) where the hot water inlet openings 24 are closed.

The temperature sensing spring 4 is an SMA (Shape Memory Alloy) spring that is disposed wedged between an extension portion 27b that extends, outwards in the radial direction, from the outer peripheral face of the inner tubular portion 27 of the cap body 2b, and the closing wall 33 of the control valve element 3. The temperature sensing spring 4 biases the control valve element 3 toward the hot water inlet openings 24.

The bias spring 5 is inserted in the inner tubular portion 32 of the control valve element 3. In the mixing faucet 1 of the first embodiment, the inner tubular portion 32 corresponds to a housing portion of the control valve element. One end of the bias spring 5 abuts the inner face of the closing wall 33 via a washer 5a, while the other end of the bias spring 5 abuts the bottom outer face of the slider 6.

A plurality of groove portions 6a, extending in the axial direction, is formed in the outer peripheral face of the slider 6, at intervals in the circumferential direction. A plurality of ribs 29, corresponding to the groove portions 6a, are formed, extending in the axial direction, on the inner peripheral face of the casing main body 2a. The slider 6 is prevented from rotating within the casing 2 through engaging of the groove portions 6a and the ribs 29. A female screw thread 6b is formed on the inner peripheral face of the slider 6, and a hole portion 6c running through the axial direction is formed in the bottom wall of the slider 6.

A temperature adjusting screw 7 is disposed inside the casing 2, at a position between the slider 6 and the bottom wall of the casing main body 2a. The temperature adjusting screw 7 comprises a connecting portion 71 that is exposed out through a hole portion 25 of the casing main body 2a, and that is connected to a temperature adjusting dial or the like, not shown; an annular projection 72 provided in the center of the temperature adjusting screw 7, in the axial direction, and that extends in the radial direction and becomes locked to the inner face of the bottom wall of the casing main body 2a, thereby preventing the temperature adjusting screw 7 from falling off through the casing 2 by way of the hole portion 25; and a male screw thread 73 that is screwed onto the female screw thread 6b of the slider 6. A nut receiving hole portion 74 capable of receiving a nut in a rotation-arrested state, is formed in the end face of the temperature adjusting screw 7, on the side of the slider 6.

The slider 6 slides in the axial direction, along the groove portion 29, upon rotation of the temperature adjusting screw 7. The bias spring 5 is compressed thereby in the axial direction, so that the biasing force exerted by the bias spring 5 on the control valve element 3 can be modified as a result. The balance position can be modified, and the control valve element 3 can be caused to slide to an arbitrary position, through adjustment of the balance between the biasing forces of the bias spring 5 and of the temperature sensing spring 4 that bias the control valve element 3.

The male screw thread 73 of the temperature adjusting screw 7 and the female screw thread 6b of the slider 6 are configured in such a manner that the stroke of the slider 6 is significant, even upon a small rotation of the temperature adjusting screw 7, through setting of a greater lead. When the slider 6 is away from the temperature adjusting screw 7, the biasing force of the temperature sensing spring 4 and/or of the bias spring 5 may cause the slider 6 to slide toward the temperature adjusting screw 7, causing the latter to rotate, if the lead of the male screw thread 73 and the female screw thread 6b is substantial. To prevent such an occurrence, a return prevention spring 8 is provided between the slider 6 and the annular projection 72 of the temperature adjusting screw 7, to suppress thereby unintended sliding of the slider 6.

An annular recess 91 extending in the circumferential direction is formed in the inner peripheral face of the casing main body 2a. A C-type retaining ring 92 is fitted to the annular recess 91. The C-type retaining ring 92 is disposed in such a manner that the slider 6 is prevented from falling off the temperature adjusting screw 7, and is prevented from coming into contact with the inner tubular portion 32 of the control valve element 3. As a result, the slider 6 can be prevented from falling off the temperature adjusting screw 7 when the latter is turned excessively, and can be prevented from coming into contact with the inner tubular portion 32 of the control valve element 3, averting thereby damage to the control valve element 3, when the temperature adjusting screw 7 is turned excessively. The C-type retaining ring 92 in the mixing faucet 1 of the first embodiment corresponds to the slider disengagement-preventing member. The slider disengagement-preventing member that is used may be, for instance, a CR-type retaining ring instead of the C-type retaining ring 92, so long as the slider 6 is retained by the slider disengagement-preventing member.

A pull-up spring 10 is disposed in the inner tubular portion 27 of the cap body 2b, within the temperature sensing spring 4. The inner tubular portion 27 of the first embodiment corresponds to the partition barrel. In the cold water discharge state and mixed water discharge state, one end of the pull-up spring 10 abuts the control valve element 3, and the other end abuts an extension portion 11b provided in a rod 11 that is screwed to a nut 11a serving as a locking portion in the slider 6, through the hole portion 6c of the slider 6 and the through-hole 33a of the control valve element 3.

A shoulder 11c is formed in the center of the rod 11. In the mixed water discharge state and hot water discharge state, the shoulder 11c is positioned further toward the outlet opening 28 than the inner face of the closing wall 33 of the control valve element 3. In the cold water discharge state, the shoulder 11c is positioned further toward the temperature adjusting screw 7 than the inner face of the closing wall 33, and abuts the washer 5a, which is sandwiched between the bias spring 5 and the control valve element 3, to cause the bias spring 5 to move away from the control valve element 3, and release thereby the biasing of the bias spring 5 on the control valve element 3. In the first embodiment, the bias spring release mechanism is made up of the shoulder 11c and the washer 5a.

A method for assembling the mixing faucet of the first embodiment will be explained next. For instance, the nut 11a is disposed in the nut receiving hole portion 74 of the temperature adjusting screw 7, inside the casing main body 2a. The slider 6 is then screwed to the temperature adjusting screw 7, so as to wedge the return prevention spring 8 between the slider 6 and the temperature adjusting screw 7. The temperature adjusting screw 7, the return prevention spring 8 and the slider 6 are inserted into the casing main body 2a, and the C-type retaining ring 92 is fitted to the annular recess 91.

The bias spring 5, the control valve element 3 and the temperature sensing spring 4 are inserted, in this order, into the casing main body 2a, and the cap body 2b is screwed onto the casing main body 2a. The pull-up spring 10 is inserted into the inner tubular portion 27 of the cap body 2b, and then the rod 11 is passed through the inner tubular portion 27, the pull-up spring 10, the through-hole 33a of the control valve element 3, and the hole portion 25 of the slider 6, and is screwed to the nut 11a, to complete thereby the assembly of the mixing faucet 1. A push nut may be used instead of the nut 11a. In this case, the push nut allows the rod 11 to engage with the slider 6 by being simply pushed in, and allows allaying the concerns of loosening of the nut 11a, or disengagement of the latter from the rod 11, on account of vibration or the like.

A method of using the mixing faucet 1 of the first embodiment will be explained next. Firstly, in a case where only cold water is used, the temperature adjusting screw 7 is rotated to cause the slider 6 to be drawn toward the temperature adjusting screw 7, whereupon the rod 11 that is locked to the slider 6 is drawn also toward the temperature adjusting screw 7. As a result, the shoulder 11c of the rod 11 is disposed further toward the temperature adjusting screw 7 than the closing wall 33 of the control valve element 3, and the washer 5a is locked to the shoulder 11c, whereby the biasing of the bias spring 5 on the control valve element 3 is released.

As a result, only the biasing forces of the temperature sensing spring 4 and the pull-up spring 10 act on the control valve element 3. The control valve element 3 abuts the hot water-side valve seat 24a, thereby closing the hot water inlet openings 24 and yielding a cold water discharge state in which only the cold water inlet openings 23 are open.

When the temperature adjusting screw 7 is rotated in the opposite direction, the shoulder 11c is disposed further toward the outlet opening 28 than the inner face of the closing wall 33 of the control valve element 3, and the biasing force of the bias spring 5 acts on the control valve element 3. The control valve element 3 moves to an balance position where there is balanced the biasing force of the bias spring 5 and the resultant force of the biasing force of the temperature sensing spring 4 and the biasing force of the pull-up spring 10, to bring about a mixed water discharge state in which both the cold water inlet openings 23 and the hot water inlet openings 24 are open. The balance position can be fine-tuned by causing the slider 6 to slide through rotation of the temperature adjusting screw 7, and by modifying the compression rate of the bias spring 5. Mixed water of a desired temperature can be discharged as a result from the outlet opening 28.

The elastic force of the temperature sensing spring 4 varies in accordance with changes in the temperature of the mixed water, in case that the temperature of the mixed water varies on account of changes in the inflow rate from the hot water inlet openings 24 or cold water inlet openings 23, the inflow rate changes being caused in turn by changes in water pressure. That is, when the temperature of the mixed water rises, the elastic force of the temperature sensing spring 4 increases and the balance position shifts toward the hot water inlet openings 24, whereupon the opening area of the hot water inlet openings 24 decreases while the opening area of the cold water inlet openings 23 increases. The mixed water can be maintained as a result at a predetermined temperature. By contrast, when the temperature of the mixed water drops, the elastic force of the temperature sensing spring 4 decreases, and the balance position shifts as a result toward the cold water inlet openings 23, whereupon the opening area of the cold water inlet openings 23 decreases while the opening area of the hot water inlet openings 24 increases. The temperature of the mixed water is reverted thereby to a predetermined temperature. In the mixed water discharge state, thus, the mixed water can be discharged while kept at a predetermined temperature.

When the temperature adjusting screw 7 is further rotated, the extension portion 1ib of the rod 11 moves off the outer face of the closing wall 33 of the control valve element 3 by a stretch equal to or longer than the natural length of the pull-up spring 10, as a result of which the pull-up spring 10 takes on its natural length, and the biasing of the pull-up spring 10 on the control valve element 3 is released. The feature in the first embodiment whereby the pull-up spring 10 is at its natural length in the hot water discharge state corresponds to the pull-up spring release mechanism. The bias spring 5 is further compressed by the slider 6, and the cold water inlet openings 23 are closed by the control valve element 3, to bring about the hot water discharge state where the hot water inlet openings 24 are open.

A mixing faucet 1 of a second embodiment of the present invention will be explained next with reference to FIGS. 4 to 8. A first small-diameter portion 1id is formed on the rod 11 of the mixing faucet 1 of the second embodiment, at a position on the side of the pull-up spring 10. The first small-diameter portion 1id is inserted into a gear-shaped projecting member 12 having a hole portion 12a in the center thereof (FIG. 7) and having, on the outer peripheral face, a plurality of (six) projecting portions 12b extending in the axial direction. The projecting member 12 is held wedged between a tubular body 13 into which the first small-diameter portion 1id is inserted, and a shoulder 1ie that is formed by the presence of the first small-diameter portion 1id in the rod 11. The tubular body 13 is locked by a push nut 11f that is fitted to the end portion of the first small-diameter portion 11d on the side of the outlet opening 28.

Figure 8:
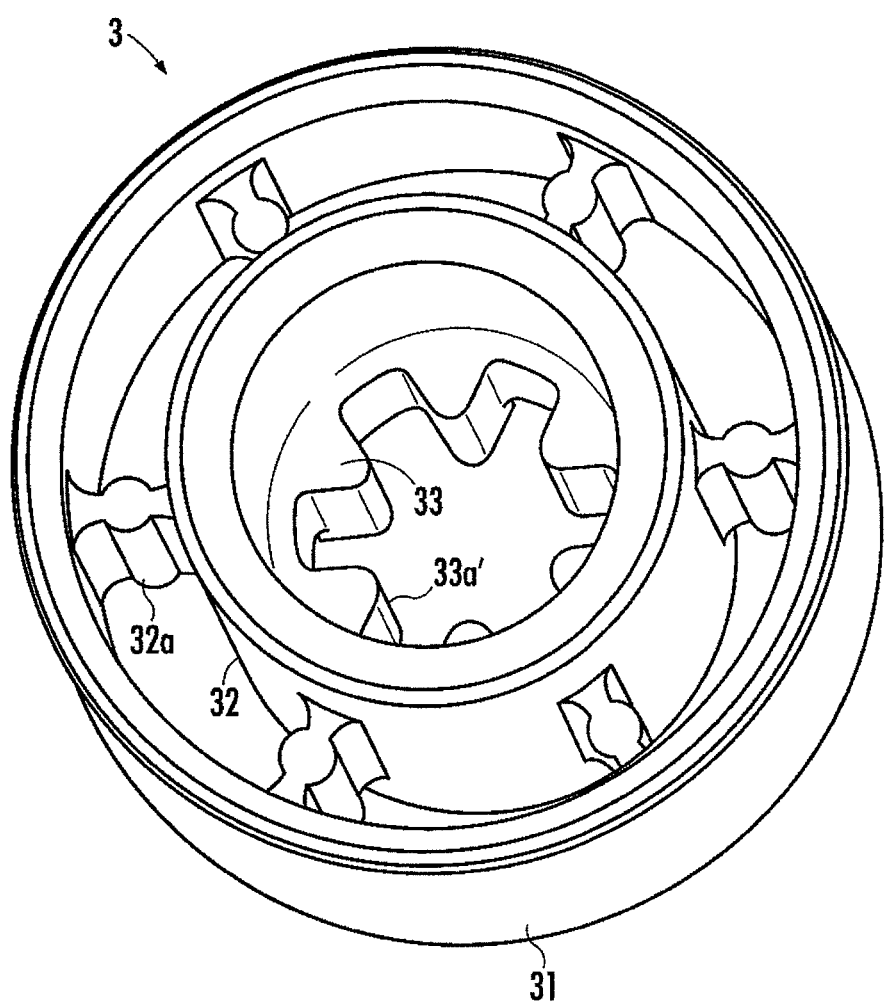
FIG. 8 is a perspective-view diagram illustrating a control valve element of the mixing faucet of the second embodiment.

A through-hole 33a' of the closing wall 33 of the control valve element 3 is formed to a shape that corresponds to the projecting member 12 (FIG. 8). The projecting member 12 is slidable in the axial direction within the through-hole 33a'. In the cold water discharge state illustrated in FIG. 4, the slider-side faces of the projecting portions 12b of the projecting member 12 are positioned further toward the slider 6 than the inner face of the closing wall 33 (opening edge of the through-hole 33a' on the side of the slider 6). The slider-side faces of the projecting portions 12b abut the washer 5a, whereby the bias spring 5 moves away from the control valve element 3, and the biasing force exerted by the bias spring 5 on the control valve element 3 is released as a result.

In the second embodiment, the projecting member 12 and the washer 5a constitute a bias spring release mechanism. As a result, the surface area over which the projecting member 12 abuts the washer 5a can be made greater than that of the shoulder 11c in the first embodiment, and the durability of the bias spring release mechanism can be also increased. The comparatively small shoulder 11c formed on the rod 11, as in the case of the first embodiment, requires high machining precision. The bias spring release mechanism of the second embodiment, by contrast, can be constructed easily without the need for high-precision machining as in the shoulder 11c of the first embodiment. This allows preventing the occurrence of malfunction of the bias spring release mechanism arising from, for instance, machining tolerances.

A second small-diameter portion 11h is formed on the slider 6-side of the rod 11. The rod 11 engages with the slider 6 by being wedged at the bottom of the slider 6 between a shoulder 11i formed by the second small-diameter portion 11h and a push nut 11g that is fitted to the second small-diameter portion 11h. The nut receiving hole portion 74 of the temperature adjusting screw 7 has a shape that corresponds to the push nut 11g. The slider disengagement-preventing member in the second embodiment is not the C-type retaining ring 92 of the first embodiment. Instead, a CR-type retaining ring 92' is engaged to the inner peripheral face of the casing main body 2a, as a result of which the slider 6 is prevented from falling off the temperature adjusting screw 7 and from coming into contact with the control valve element 3.

The cold water inlet openings 23 and hot water inlet openings 24 in the second embodiment are formed in the cap body 2b. Four projecting pieces 14 (top half of FIGS. 4 to 6), extending toward the opening end of the casing main body 2a, are provided equidistantly, in the circumferential direction, at the opening end of the cap body 2b. Respective first groove portions 14a extending in the circumferential direction are formed in the outer peripheral face of the projecting pieces 14. Four receiving portions 15, for receiving the projecting pieces 14, are sunk at the opening end of the casing main body 2a.

Figure 4:
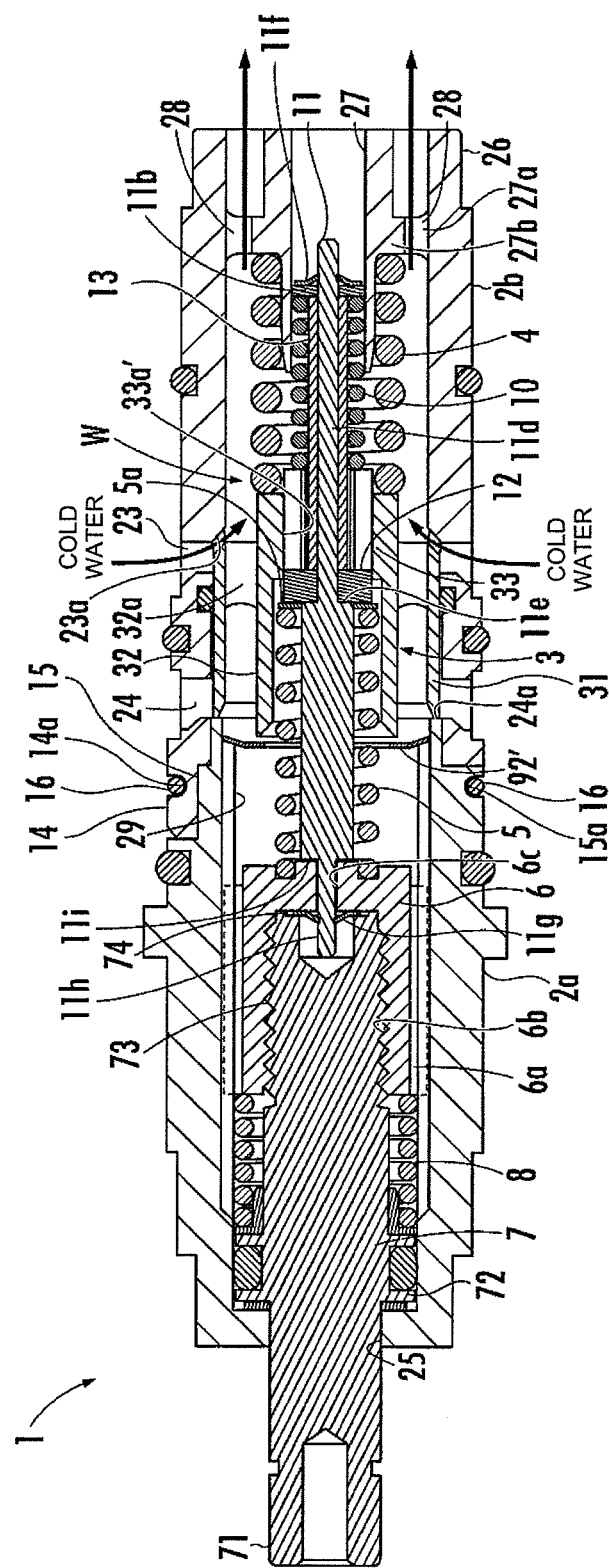
FIG. 4 is an explanatory cross-sectional diagram illustrating a cold water discharge state of a mixing faucet of a second embodiment.
Figure 5:
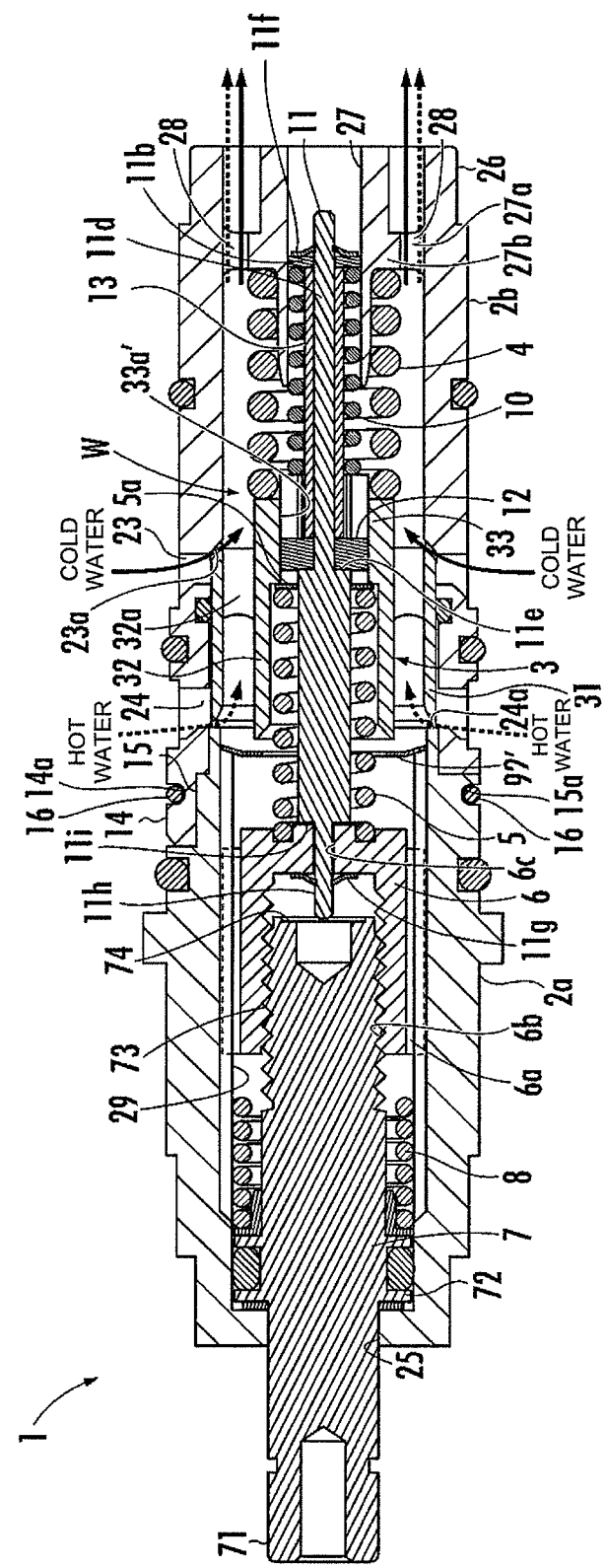
FIG. 5 is an explanatory cross-sectional diagram illustrating a mixed water discharge state of the mixing faucet of the second embodiment.
Figure 6:
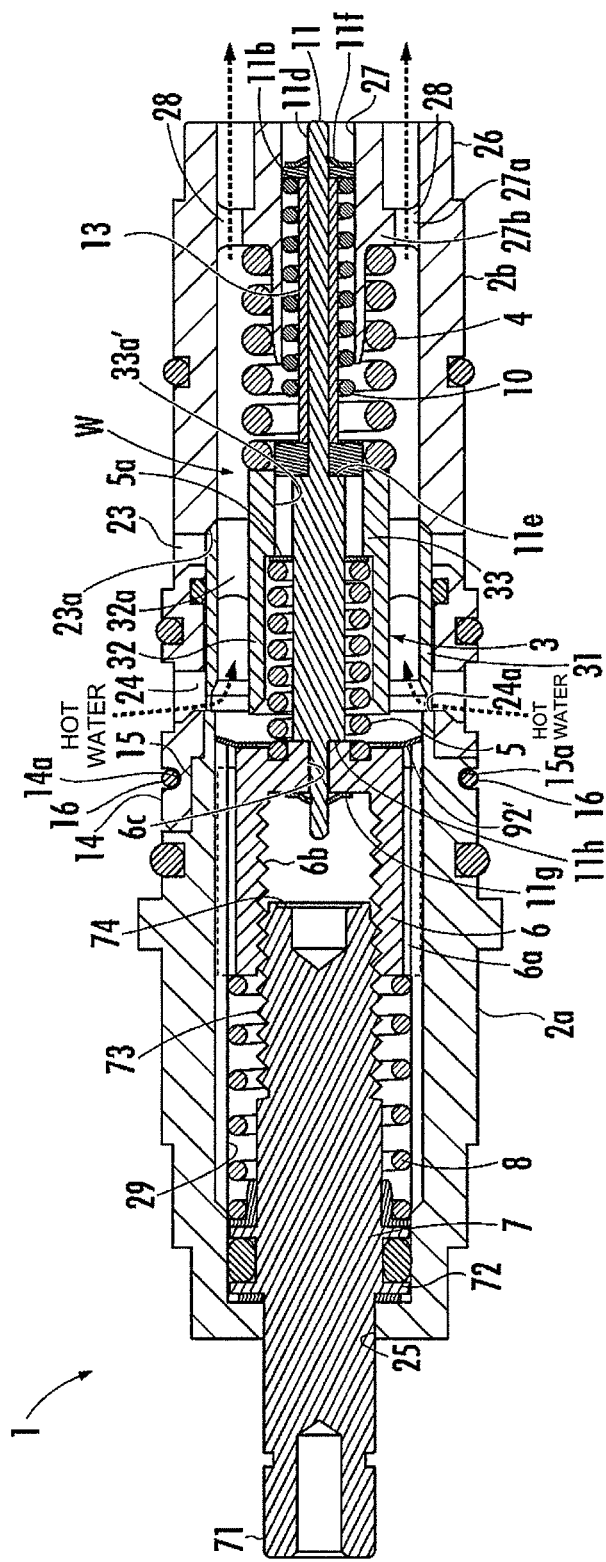
FIG. 6 is an explanatory cross-sectional diagram illustrating a hot water discharge state of the mixing faucet of the second embodiment.
Figure 7:
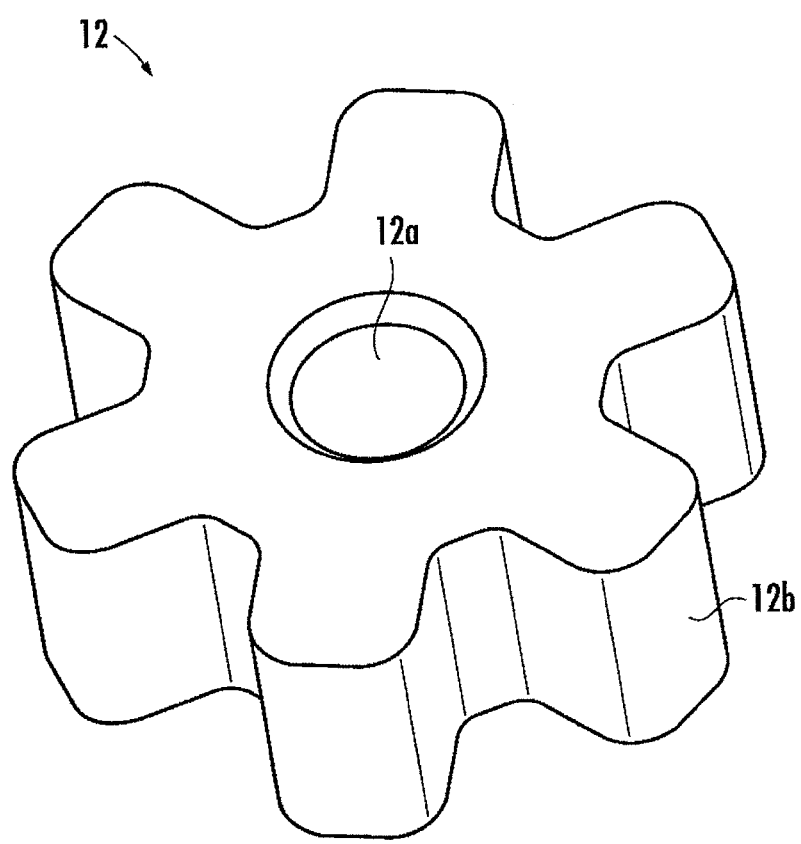
FIG. 7 is perspective-view diagram illustrating the constituent members of a bias spring release mechanism of the mixing faucet of the second embodiment.

Second groove portions 15a (bottom half of FIGS. 4 to 6), extending in the circumferential direction, are formed in the outer peripheral face of the opening end of the casing main body 2a, at positions between the receiving portions 15. The first groove portions 14a of the projecting pieces 14 and the second groove portions 15a of the casing main body 2a make up one annular groove in a state where the respective projecting pieces 14 are received on the corresponding receiving portions 15. A retaining ring 16 is fitted onto the annular groove. Connecting thus the casing main body 2a and the cap body 2b allows preventing loosening of the connection between the casing main body 2a and the cap body 2b, caused by vibration or the like, as compared with a case in which the casing main body 2a and the cap body 2b are screwed to each other, as in the first embodiment. In FIGS. 4 to 6, the cross sections of the lower half and of the upper half with respect to the axis centerline of the casing 2 form an angle of 135 degrees, in such a way that both the first groove portions 14a and the second groove portions 15a are depicted in the figures.

In the second embodiment, the hot water-side valve seat 24a is formed at the opening edge of the casing main body 2a, and the annular cold water-side valve seat 23a, which protrudes inwards in the radial direction and opposes the hot water-side valve seat, is formed in the inner peripheral face of the cap body 2b, at a position on the opening edge of the cold water inlet openings 23, on the side of the outlet opening 28. Other features and methods of use in the second embodiment are identical to those of the first embodiment.

The method for assembling the mixing faucet 1 of the second embodiment is the same as that of the first embodiment, except that herein, firstly, there are supported, in this order, the first small-diameter portion 11d of the rod 11, the projecting member 12, the tubular body 13, the pull-up spring 10, the tubular body 13 and the annular body that corresponds to the extension portion 11b that engages with the end of the pull-up spring 10; the push nut 11f for preventing the foregoing from falling off is engaged next, and thereafter the push nut 11g disposed in the nut receiving hole portion 74 of the temperature adjusting screw 7 is engaged to the rod 11; and except that, secondly, the respective projecting pieces 14 of the cap body 2b are fitted to the corresponding receiving portions 15 of the casing main body 2a, and the retaining ring 16 is fitted to the annular groove made up of the groove portions 14a, 15a, to connect thereby the casing main body 2a and the cap body 2b.

In the mixing faucets 1 of both embodiments, the bias spring 5 that biases the control valve element 3 toward the cold water inlet openings 23 is at balance with the resultant force from the temperature sensing spring 4 and the pull-up spring 10 that bias the control valve element 3 toward the hot water inlet openings 24, in the mixed water discharge state. Therefore, the biasing force of the temperature sensing spring 4 can be reduced, through a smaller wire diameter and fewer turns, in proportion to the biasing that the pull-up spring 10 exerts on the control valve element 3. This allows reducing overall costs in a mixing faucet 1 that uses a low-cost temperature sensing spring 4.

In the conventional case where the pull-up spring 10 is disposed between the temperature adjusting screw 7 and the slider 6, space must be secured for arranging thus the pull-up spring 10 between the temperature adjusting screw 7 and the slider 6. This precludes reducing the size of the casing 2. In the above two embodiments, by contrast, the pull-up spring 10 is disposed within the temperature sensing spring 4. As a result, the space within the temperature sensing spring 4 can be exploited to allow the pull-up spring 10 to be assembled into the casing 2 without increasing the size of the latter.

When the pull-up spring 10 is disposed within the temperature sensing spring 4, the hot and cold water that flow inside the casing 2 come into contact with the temperature sensing spring 4, and hence the hot and cold water come also into contact with the pull-up spring 10. This may give rise to noise and/or increased flow-path resistance that accompany the resulting turbulent flow. In the mixing faucet 1 of the first embodiment, however, the inner tubular portion 27, as a partition barrel, makes it less likely for hot and cold water that flow inside the casing 2 to come into contact with the pull-up spring 10. This suppresses the generation of turbulent flow, so that noise and increases in flow passage resistance can be prevented as a result.

The biasing force from the bias spring 5 on the control valve element 3 is released by the bias spring release mechanism upon drawing of the slider 6 toward the temperature adjusting screw 7, and accompanying closing of the hot water inlet openings 24 by the control valve element 3, through rotation of the temperature adjusting screw 7. Therefore, the control valve element 3 can be caused to slide smoothly toward the hot water inlet openings 24 on account of the biasing forces of the temperature sensing spring 4 and the pull-up spring 10, and the hot water inlet openings 24 can be closed reliably and easily by the control valve element 3.

The pull-up spring 10 biases the control valve element 3 toward the hot water inlet openings 24 during the cold water discharge state and the mixed water discharge state. The biasing force of the temperature sensing spring 4 can be weakened as a result. In the hot water discharge state, the biasing force of the bias spring 5 overcomes the biasing force of the temperature sensing spring 4, so that the control valve element 3 can easily close thereby the cold water inlet openings 23, and the biasing force load that the springs exert on the control valve element 3 is reduced. Durability can be enhanced thereby.

The inner tubular portion 32 serving as a housing portion prevents the hot water that flows in from the hot water inlet openings 24 from coming into contact with the bias spring 5. Turbulent flow is suppressed thereby, so that increases in the flow passage resistance and generation of noise can both be curtailed as a result.

In the second embodiment, the projecting member 12 that constitutes the bias spring release mechanism is fixed to the rod 11 by being wedged between the tubular body 13 and the shoulder lie of the rod 11. The method for fixing projecting member 12 is not limited thereto. For instance, the projecting member 12 may be wedged between two tubular bodies into which the rod 11 is inserted. Alternatively, the rod 11 may comprise two short rod members screwed together, such that the projecting member 12 is wedged between these rod members.

The projecting member 12 is not limited to the gear shape illustrated in the second embodiment. The projecting member 12 may have any other shape, so long as it has a projecting portion that protrudes outwards in the radial direction beyond the outer peripheral face of the rod 11, and can release the biasing of the bias spring 5 exerted on the control valve element 3.

What is claimed is:

1. A mixing faucet, comprising:
a tubular casing;
a hot water inlet opening and a cold water inlet opening provided, spaced part from each other in the axial direction, in the peripheral wall of the casing;
an outlet opening provided in the end of the casing, on the side of the cold water inlet opening;
a control valve element provided inside the casing, the control valve element disposed so as to be slidable within the casing in the axial direction, and capable of switching, by sliding within the casing, between any one of a cold water discharge state of closing the hot water inlet opening and opening the cold water inlet opening, whereby only cold water is discharged out of the outlet opening, a mixed water discharge state of opening the hot water inlet opening and the cold water inlet opening, whereby hot and cold water are mixed and discharged out of the outlet opening, and a hot water discharge state of opening the hot water inlet opening and closing the cold water inlet opening, whereby only hot water is discharged out of the outlet opening;

a temperature adjusting screw rotatably disposed inside the casing, at one end thereof on the side of the hot water inlet opening, such that one end of the temperature adjusting screw is exposed out of the casing in the axial direction;

a slider that is disposed inside the casing so as to be screwed to the temperature adjusting screw in a state of being prevented from rotating, and that slides in the axial direction within the casing through rotation of the temperature adjusting screw;

a bias spring that is disposed inside the casing between the control valve element and the slider, and that biases the control valve element toward the cold water inlet opening;

a temperature sensing spring that is disposed inside the casing, and that biases the control valve element toward the hot water inlet opening, the elastic force of the temperature sensing spring changes in accordance with changes in the temperature of hot and cold water flowing inside the casing; and a pull-up spring that biases the control valve element toward the hot water inlet opening in the cold water discharge state and the mixed water discharge state, wherein a through-hole running through in the axial direction of the casing is formed in the control valve element, there is provided a rod that has, at one end thereof, a locking portion which is locked to the slider, wherein the rod extends through the through-hole of the control valve element up to the inside of the temperature sensing spring, and that has, at the other end thereof, an extension portion that extends outwards in the radial direction, and the pull-up spring is disposed between the control valve element and the extension portion of the rod, within the temperature sensing spring.

2. The mixing faucet according to claim 1, wherein a partition barrel that suppresses contact of hot and cold water with the pull-up spring is provided between the pull-up spring and the temperature sensing spring.

3. The mixing faucet according to claim 1, further comprising a bias spring release mechanism that releases the biasing of the bias spring on the control valve element in the cold water discharge state, and the bias spring release mechanism includes a projecting member that is provided in the rod, is slidable within the through-hole of the control valve element, and has a projecting portion that protrudes outwards, in the radial direction, beyond the outer peripheral face of the rod, such that in the cold water discharge state, and end face of the projecting portion of the projected member, on the side of the slider, is positioned further toward the slider than an opening end of the through-hole of the control valve element, on the side of the slider, and the bias spring moves away from the control valve element by the abutment of the projecting member and the bias spring, whereby the biasing of the bias spring on the control valve element is released.

4. The mixing faucet according to claim 1, further comprising a pull-up spring release mechanism that releases the biasing of the pull-up spring on the control valve element in the hot water discharge state.

5. The mixing faucet according to claim 1,
wherein the bias spring is housed in a housing portion provided in the control valve element; and an end of the housing portion, on the side of the slider, is position further toward the slider than the hot water inlet opening in the hot water discharge state.

6. The mixing faucet according to claim 1, further comprising a slider disengagement-preventing member that is provided on the inner peripheral face of the casing and between the slider and the control valve element, and that prevents the slider from disengaging form the temperature adjusting screw as a result of unscrewing of the temperature adjusting screw and the slider.

7. A mixing faucet, comprising:

a tubular casing;

a hot water inlet opening and a cold water inlet opening provided, spaced part from each other in the axial direction, in the peripheral wall of the casing;

an outlet opening provided in the end of the casing, on the side of the cold water inlet opening;

a control valve element provided inside the casing, the control valve element disposed so as to be slidable within the casing in the axial direction, and capable of switching, by sliding within the casing, between any one of a cold water discharge state of closing the hot water inlet opening and opening the cold water inlet opening, whereby only cold water is discharged out of the outlet opening, a mixed water discharge state of opening the hot water inlet opening and the cold water inlet opening, whereby hot and cold water are mixed and discharged out of the outlet opening, and a hot water discharge state of opening the hot water inlet opening and closing the cold water inlet opening, whereby only hot water is discharged out of the outlet opening;

a temperature adjusting screw rotatably disposed inside the casing, at one end thereof on the side of the hot water inlet opening, such that one end of the temperature adjusting screw is exposed out of the casing in the axial direction;

a slider that is disposed inside the casing so as to be screwed to the temperature adjusting screw in a state of being prevented from rotating, and that slides in the axial direction within the casing through rotation of the temperature adjusting screw;

a bias spring that is disposed inside the casing between the control valve element and the slider, and that biases the control valve element toward the cold water inlet opening;

a temperature sensing spring that is disposed inside the casing, and that biases the control valve element toward the hot water inlet opening, the elastic force of the temperature sensing spring changes in accordance with changes in the temperature of hot and cold water flowing inside the casing; and a pull-up spring that biases the control valve element toward the hot water inlet opening in the cold water discharge state and the mixed water discharge state, wherein the casing comprises a casing main body and a cap body connected to the casing main body; one end of the casing main body or the cap body is formed with a plurality of projecting pieces extending toward the other end; a plurality of receiving portions that receive the projecting pieces are formed in the outer peripheral face of the other end; first groove portions extending in the circumferential direction are formed in the outer peripheral face of the projecting pieces; second groove portions extending in the circumferential direction are formed in the outer peripheral face of the other end, at positions between the receiving portions; each of the first groove portions and each of the second groove portions making an annular groove continuous in the circumferential direction, in a state where each of the projecting pieces is received in the corresponding receiving portion; and a retaining ring is fitted to the annular groove.

8. The mixing faucet according to claim 7, wherein a through-hole running through in the axial direction of the casing is formed in the control valve element, there is provided a rod that has, at one end thereof, a locking portion which is locked to the slider, wherein the rod extends through the through-hole of the control valve element up to the inside of the temperature sensing spring, and that has, at the other end thereof, an extension portion that extends outwards in the radial direction, and the pull-up spring is disposed between the control valve element and the extension portion of the rod, within the temperature sensing spring.

9. The mixing faucet according to claim 8, wherein a partition barrel that suppresses contact of hot water and cold water with the pull-up spring is provided between the pull-up spring and the temperature sensing spring.

10. The mixing faucet according to claim 7, further comprising a bias spring release mechanism that releases the biasing of the bias spring on the control valve element in the cold water discharge state.

11. The mixing faucet according to claim 10, wherein a through-hole running through in the axial direction of the casing is formed in the control valve element, further comprising a rod that has, at one end thereof, a locking portion which is locked to the slider, wherein the rod extends through the through-hole of the control valve element up to the inside of the temperature sensing spring, and the bias spring release mechanism includes a projecting member that is provided in the rod, is slidable within the through-hole of the control valve element, and has a projecting portion that protrudes outwards, in the radial direction, beyond the outer peripheral face of the rod, such that in the cold water discharge state, and end face of the projecting portion of the projected member, on the side of the slider, is positioned further toward the slider than an opening end of the through-hole of the control valve element, on the side of the slider, and the bias spring moves away from the control valve element by the abutment of the projecting member and the bias spring, whereby the biasing of the bias spring on the control valve element is released.

12. The mixing faucet according to claim 7, further comprising a pull-up spring release mechanism that releases the biasing of the pull-up spring on the control valve element in the hot water discharge state.

13. The mixing faucet according to claim 7, wherein the bias spring is housed in a housing portion provided in the control valve element; and an end of the housing portion, on the side of the slider, is position further toward the slider than the hot water inlet opening in the hot water discharge state.

14. The mixing faucet according to claim 7, further comprising a slider disengagement-preventing member that is provided on the inner peripheral face of the casing and between the slider and the control valve element, and that prevents the slider from disengaging form the temperature adjusting screw as a result of unscrewing of the temperature adjusting screw and the slider.

\* \* \* \* \*